A. H. Clark,
Sawing Shingles,
N° 39,272. Patented July 21, 1863.
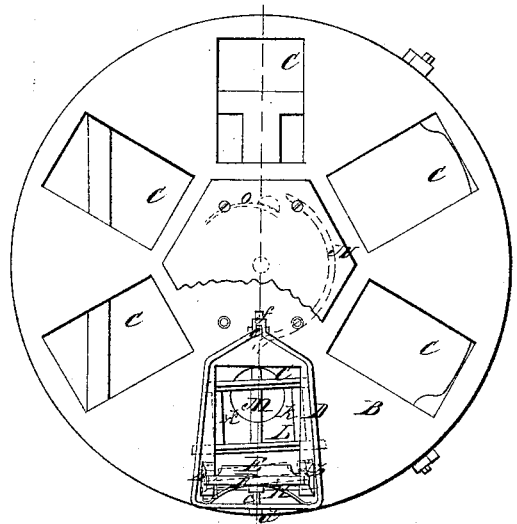
Fig. 1
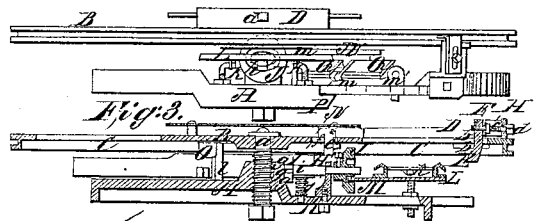
Fig. 2
Fig. 4. Fig. 5.
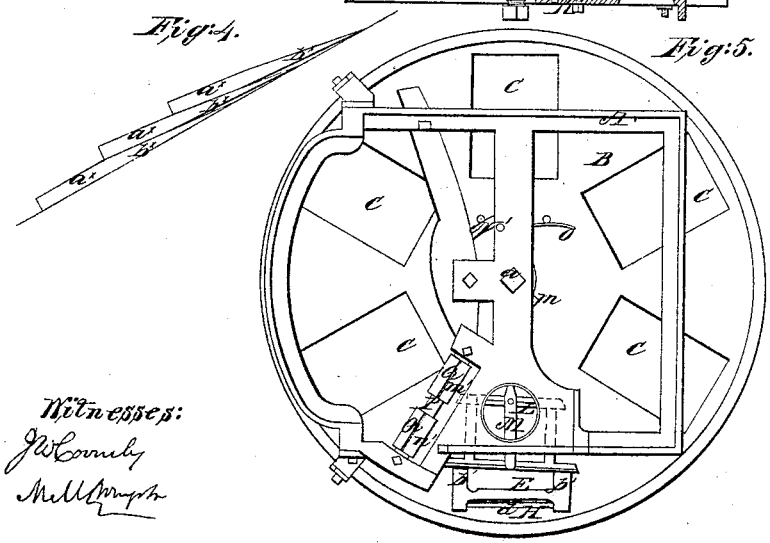
Witnesses:
Inventor:
A. H. Clarke
per Munn
Attorneys

UNITED STATES PATENT OFFICE.

A. H. CLARK, OF FOND DU LAC, WISCONSIN.

IMPROVED SHINGLE-MACHINE.

Specification forming part of Letters Patent No. 39,272, dated July 21, 1863.

*To all whom it may concern:*

Be it known that I, A. H. CLARK, of Fond du Lac, in the county of Fond du Lac and State of Wisconsin, have invented a new and Improved Shingle-Machine; and I do hereby declare that the following is a full, clear, and exact description of the same, reference being had to the accompanying drawings, making a part of this specification, in which—

Figure 1 is a plan or top view of my invention; Fig. 2, a side view of the same; Fig. 3, a vertical section of the invention, taken in the line $x\ x$, Fig. 1; Fig. 4, a view of the shingles produced by the same; Fig. 5, an inverted plan or bottom view of the same.

Similar letters of reference indicate corresponding parts in the several figures.

This invention relates to an improved shingle-machine of that class in which a revolving bolt-plate is used in connection with a circular saw, such as may be seen in a patent granted to me June 4, 1861.

The within-described invention consists in a novel manner of dogging the shingle-bolt and using in connection with the dogging mechanism a rotary planer, all arranged to operate as herein set forth, whereby the shingles may be cut from the bolt in a more desirable form than by the machines of this class hitherto used for the purpose.

To enable those skilled in the art to fully understand and construct my invention, I will proceed to describe it.

A represents a stationary horizontal frame, on which a circular plate, B, is pivoted centrally, as shown at $a$. This plate B is allowed to rotate freely on its axis $a$, and may be driven by a belt or any suitable arrangement of gearing. The plate B has a series of rectangular holes or openings, C, made radially in it, and of such dimensions as to admit of the shingle-bolts passing through them. These holes or openings are all shown in the plate B; but the parts connected with them, which consist of a frame, D, and dog E, are shown applied to one hole only, as they are all alike. This frame D is placed on the plate B, and is of such dimensions as to extend around its hole C at a short distance from the edge of the latter, as shown clearly in Fig. 1.

F is a slide-bar, to the lower end of which the dog E is attached, or the dog may be formed out of the same piece of metal as the slide-bar. The slide-bar and dog are provided, respectively, with plates $b\ b'$ at their ends, which bear against the upper and lower surfaces of B, as shown in Figs. 1 and 3, and hold the slide-bar and dog in proper position, while they admit of said parts working freely back and forth. The slide-bar F is connected by a screw, $c$, with a semi-elliptic spring, H, the ends of which bear against the inner surface of the outer end of the frame D, and said spring is connected by a screw, $c$, to the outer end of said frame, as shown in Fig. 1. The dog E extends nearly the whole width of the hole C, to which it is applied, and it may have a smooth or serrated edge. It is provided with a smooth edge in Fig. 1. The screw $c$ passes loosely through the outer end of the frame D, and it has a head, $d$, on its outer end. The inner end of the frame D is provided with a pendent pin, $e$, which passes through an oblong slot, $f$, in the plate B.

On the frame A there is placed a short shaft, H', one end of which has a tappet-wheel, I, placed on it. (See Fig. 3.) This tappet-wheel has four arms, $g$, which project radially from the shaft H' at equal distances apart. On the opposite and outer end of the shaft H' there is placed a wheel, J, which has an oval groove, $h$, made in outer side, as shown in Fig. 1. The shaft H', adjoining the tappet-wheel I, is of square or rectangular form, as shown at $i$, Fig. 3, and this square portion rests or bears on the upper end of a vertical rod, K, which passes loosely through the frame A, and has a spiral spring, $j$, upon it, which has a tendency to keep the upper end of the rod K in contact with the square portion $i$ of the shaft H and prevent the same from casually moving or turning.

On the frame A there is also placed a tilting bed, L, which is a square frame fitted centrally at its sides on pivots $k\ k$, as shown in Fig. 2. This bed L has a rod, M, attached to its under side, said rod projecting beyond the inner end of the bed and fitting in the oval groove $h$ of the wheel J.

To the frame A, near its center, there is attached a curved bar, N, the form of which is clearly shown by the dotted lines, Fig. 1, and O is a spring, which is attached to an upright, $l$, on frame A.

To the plate B, near its center, there is attached a pendent pin, $m$, which, as the plate B rotates, strikes the arms *g* of the tappet-wheel and turns the shaft H' one-quarter of a revolution at each revolution of the plate B.

P is a shaft, which is placed on the frame A in a position radial with the plate B. This shaft P is provided with two square heads, $m'$ $m'$, to two opposite sides of each of which there are secured cutters Q Q, which serve as planers. This shaft P may be rotated in any proper way.

The operation is as follows: The shingle-bolts are fitted in the holes or openings C of the rotating plate B, and pass by the rotation of the plates B consecutively over the tilting bed L. Each time a bolt arrives on the bed L the frame D is drawn inward in consequence of the pendent pin *e* coming in contact with the curved bar N, and the bolt is dogged or firmly held in position. Previous to the dogging of the bolt the latter was loose in the hole C, and, consequently, was allowed to rest on the bed and have an inclined position. This inclined position causes the shingles to be cut or sawed from the bolt in taper form, for the saw rotates in a horizontal plane. The bed L is tilted at every revolution of the plate B by means of the rod M and oval groove *h* in the wheel J, the bed being tilted in a reverse inclined position at each revolution of the plate B. The amount or degree of inclination corresponds, of course, to the difference between the major and minor diameters of the groove *h*. After each bolt leaves the bed L its under surface is planed off at its butt-end by one pair of the rotary planes Q Q, and the bolts next come in contact with the saw, which cuts off the shingles from the under sides of the bolts in a horizontal plane. The saw, which is an ordinary circular one, is not shown in the drawings. It may be placed at any point between the rotary planers and the point in the revolution of the plate B where the bolts are released from the dogs. After the bolts have passed the saw the pendent pin *e* comes in contact with the spring O, which throws outward the frames D, and thereby undogs or releases the bolts, so that the latter will remain loose in the holes or openings C and be capable of being adjusted by the bed L as they pass upon it. It is designed to have the bolts when un-dogged drop on suitable ways, (not shown,) which should be as high as the bed L, so that the bolts may be drawn upon the latter and not catch against it. It is also designed that the planers shall plane off a portion of the shingles at their butt-ends equal to the desired length of the weather-surface of the same, as designated by $a^\times$ in Fig. 4. By this means it will be seen that the weather-surfaces are made of an equal thickness throughout, the taper portion $b^\times$ of the shingles being the covered surfaces. The shingles are thereby rendered much more durable than those which are cut with a gradual taper throughout their entire length. By operating the dog as shown, bolts may be grasped and firmly held in position. The dog will be actuated or operated with certainty and will adjust itself to bolts which are not square at the ends—that is to say, not at right angles with their ends, for as the slide bar F is attached centrally to the spring H by the screw *c* and the latter passes loosely through the outer end of the frame D, it will be seen that the slide-bar and dog may be canted or turned in either direction more or less obliquely with the ends of the hole or opening C. (See Fig. 1, in which an oblique portion of the dog is shown in red outline.)

I do not claim the means employed for tilting the bed L, for that was patented by me June 4, 1861; but,

Having thus described my invention, what I claim as new, and desire to secure by Letters Patent, is—

1. The dog G, attached to or formed with the slide-bar F, in combination with the spring H, screw *c*, and frame D, all being arranged and applied to the rotating plate B, to operate as and for the purpose herein set forth.

2. Operating the dog G through the medium of the stationary curved bar N, pendent pin *e* of frame D, and the spring O, all arranged substantially as herein described.

3. The rotary planers Q, when used in combination with the bed L, for the purpose herein set forth.

A. H. CLARK.

Witnesses:
J. J. DRIGGS,
E. M. SIMMON.